United States Patent
Motojima et al.

[11] Patent Number: 6,073,948
[45] Date of Patent: Jun. 13, 2000

[54] STRUCTURE AND METHOD FOR MOUNTING A MOTORCYCLE FENDER AND BACKREST

[75] Inventors: Tomoyasu Motojima; Seiji Hanafusa; Hitoshi Suzuki; Yuji Tsujimoto; Tadashi Sugano; Takayuki Mori, all of Saitama, Japan

[73] Assignee: Honda Giken Kogyo Kabushiki Kaisha, Tokyo, Japan

[21] Appl. No.: 08/988,409

[22] Filed: Dec. 10, 1997

[30] Foreign Application Priority Data

Dec. 25, 1996 [JP] Japan .................................. 8-345183
Dec. 25, 1996 [JP] Japan .................................. 8-345184

[51] Int. Cl.$^7$ .................................................. B62D 25/18
[52] U.S. Cl. .................................. 280/152.2; 280/152.1; 280/852; 280/160.1; 280/288.4; 180/219
[58] Field of Search ........................... 280/152.1, 152.2, 280/852, 160.1, 288.4, 293; 180/219

[56] References Cited

U.S. PATENT DOCUMENTS

| Re. 33,178 | 3/1990 | Ahlberg | 280/304.3 |
|---|---|---|---|
| 4,095,820 | 6/1978 | Hanagan | 280/289 |
| 4,485,884 | 12/1984 | Fukunaga et al. | 180/219 |
| 5,588,698 | 12/1996 | Hsueh | 280/288.4 |
| 5,667,232 | 9/1997 | Gogan et al. | 280/202 |

FOREIGN PATENT DOCUMENTS

Y2-4-37033  9/1992  Japan .

*Primary Examiner*—Daniel G. DePumpo
*Assistant Examiner*—James S. McClellan
*Attorney, Agent, or Firm*—Birch, Stewart, Kolasch & Birch, LLP

[57] ABSTRACT

A rear fender mounting structure includes features for simplifying the assembly of a rear fender, sub-frame, and grab rails to a rear frame of a motorcycle. The sub-frame has brackets welded onto it. The brackets include holes with protruding collars defining the holes. The rear fender has holes lined with rubber bushings. The protruding collars are fitted into the rubber bushings. The rear fender includes a bracket which is hooked over a crossbar of the motorcycle frame. The fender is then lifted from its rear end, by pivoting the bracket about the crossbar. When alignment occurs between the bracket holes and holes in the rear frame, linkage plates with bolts extending therefrom, are employed. The bolts are passed through the aligned holes. Next, holes in the grab rails can be easily aligned with the ends of the bolts. Nuts are used to secure the arrangement. The backrest mounting structure includes features for dampening vibrations in the backrest, and for improving the appearance of the motorcycle by placing the attachment of the backrest inside the grab rails. Upper and lower rubber members sandwich lower portions of the backrest supporting members. The lower portions of the backrest supporting members are tilted 45 degrees relative to horizontal and are located inside the grab rails.

20 Claims, 6 Drawing Sheets

STRUCTURE AND METHOD FOR MOUNTING A MOTORCYCLE FENDER AND BACKREST

BACKGROUND OF THE INVENTION

1. Field of the Invention

The present invention relates to a rear fender mounting structure and a backrest mounting structure for a motorcycle.

2. Description of the Relevant Art

Japanese Utility Model Publication No. Hei 4-37033 discloses a motorcycle including a rear fender supported on rear portions of a body frame. The rear fender extends rearward from a driver's seat. Grab rails are provided on the right and left sides of the rear fender. A fellow rider's seat is disposed on the rear fender, and a backrest is disposed behind the fellow rider's seat.

In mounting the rear fender, the rear fender is held between rear portions of the body frame and the grab rails. The rear portions of the body frame are disposed inside the rear fender, and the grab rails are disposed outside the rear fender. Bolts pass through the grab rails, and through holes formed in side portions of the rear fender. Leading ends of the bolts are threadably engaged with nuts previously welded on the rear portions of the body frame. Thus, the rear fender is securely supported on the rear portions of the body frame.

In an alternative rear fender mounting configuration according to the background art, a body frame is disposed outside the rear fender and a subframe is disposed inside the rear fender. In this configuration, a part of the body frame, located outside the rear fender, is visible. The sub-frame, which is disposed inside the rear fender, supports a tail light and a mud guard.

Using the rear fender mounting structures of the background art, it is difficult to mount the rear fender to the motorcycle. It is very inconvenient to align all of the mounting holes involved, while passing a bolt through the aligned mounting holes, and threading a nut on the end of the bolt. The fender mounting structures, according to the background art, can lead to delays in mounting the rear fender on the motorcycle, and possibly require the efforts of more than one worker to accomplish the task.

Accordingly, there exists a need in the art for a simplified rear fender mounting structure which can facilitate quick and easy mounting of a rear fender onto a motorcycle.

Also, the motorcycle of Japanese Utility Model Publication Hei 4-37033 has backrest supporting brackets supporting the backrest. The backrest supporting brackets extend downward from right and left sides of the backrest. Lower ends of the backrest supporting brackets are continuously formed to rear ends of the grab rails. By this arrangement, the backrest is supported by the body frame when the grab rails are attached to the body frame.

This backrest supporting arrangement suffers drawbacks. For example, a fellow rider may desire to hold the backrest supporting brackets during running of the vehicle. When the back rest supporting brackets are used as grips, vibrations from the engine are transmitted to the hands of the fellow rider.

In other motorcycles according to the background art, the backrest supporting brackets are not connected to the grab rails. Instead, the backrest supporting brackets have their lower ends fastened to frame members, or stays, of the sides of the motorcycle's body using bolts or the like. However, this mounting arrangement damages the appearance of the motorcycle's body, and requires that holes be made in the frame member, or stay.

Accordingly, there exists a need in the art for a simplified backrest mounting structure which can facilitate quick and easy mounting of a backrest onto a motorcycle while dampening any vibrations transmitted from the motorcycle's engine to the backrest.

SUMMARY OF THE INVENTION

It is an object of the present invention to solve the shortcomings of the background art by providing improved mounting structures for mounting a motorcycle fender and backrest.

According to the present invention, there is provided a rear fender supporting structure for a motorcycle including a motorcycle frame including a right frame member and a left frame member, a rear fender disposed between said right and left frame members, grab rails disposed adjacent said right and left frame members; and a subframe disposed inside said rear fender, wherein said subframe is preassembled to said rear fender to from a rear fender preassembly, and said rear fender preassembly and said grab rails are fixed to said right and left frame members.

Further according to the present invention, there is provided a method for attaching a rear fender to a motorcycle including providing a motorcycle frame with a right frame member and a left frame member, providing a rear fender, a subframe, and grab rails, inserting the subframe inside the rear fender, attaching the subframe to the rear fender to form a rear fender preassembly, inserting the rear fender preassembly between the right frame member and the left frame member, fixing the rear fender preassembly to the right frame member and the left frame member, and attaching the grab rails to the right frame member and the left frame member.

Still further according to the present invention, there is provided a backrest supporting structure for a motorcycle including a backrest, right and left supporting members extending downward from right and left sides of said backrest, respectively, a motorcycle frame, right and left grab rails disposed on right and left sides of said motorcycle frame, respectively, each grab rail having an approximate unshaped cross section which opens toward said motorcycle frame, right and left mounting plates disposed inside the approximate u-shape cross section of said right and left grab rails, respectively, and right and left lower end portions provided on said right and left supporting members, respectively, said right lower end portion being attached to said right mounting plate by a first fastener, and said left lower end portion being attached to said left mounting plate by a second fastener.

Other objects and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

Figure 1:
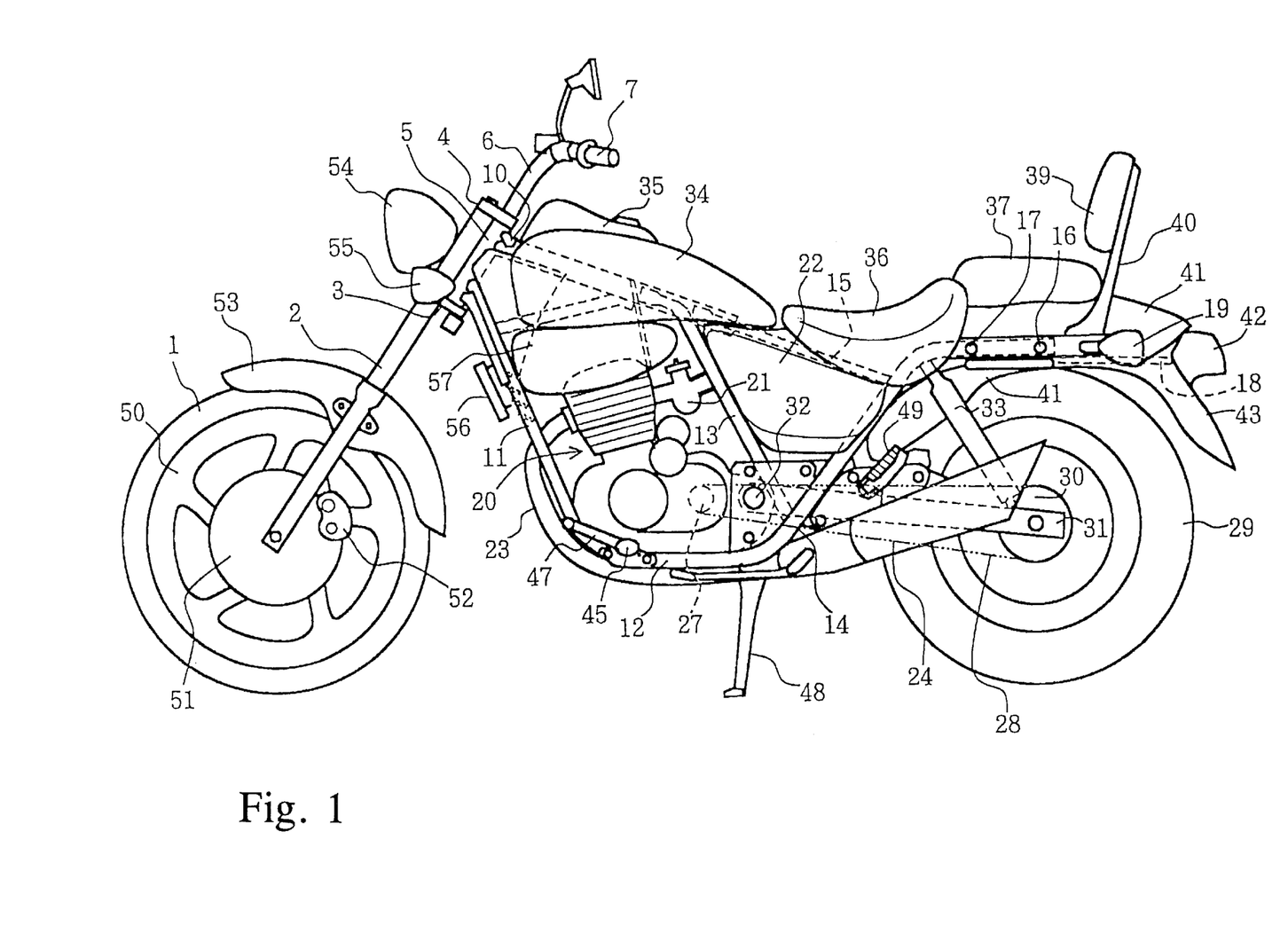
FIG. 1 is a left side view of the entire motorcycle.
Figure 2:
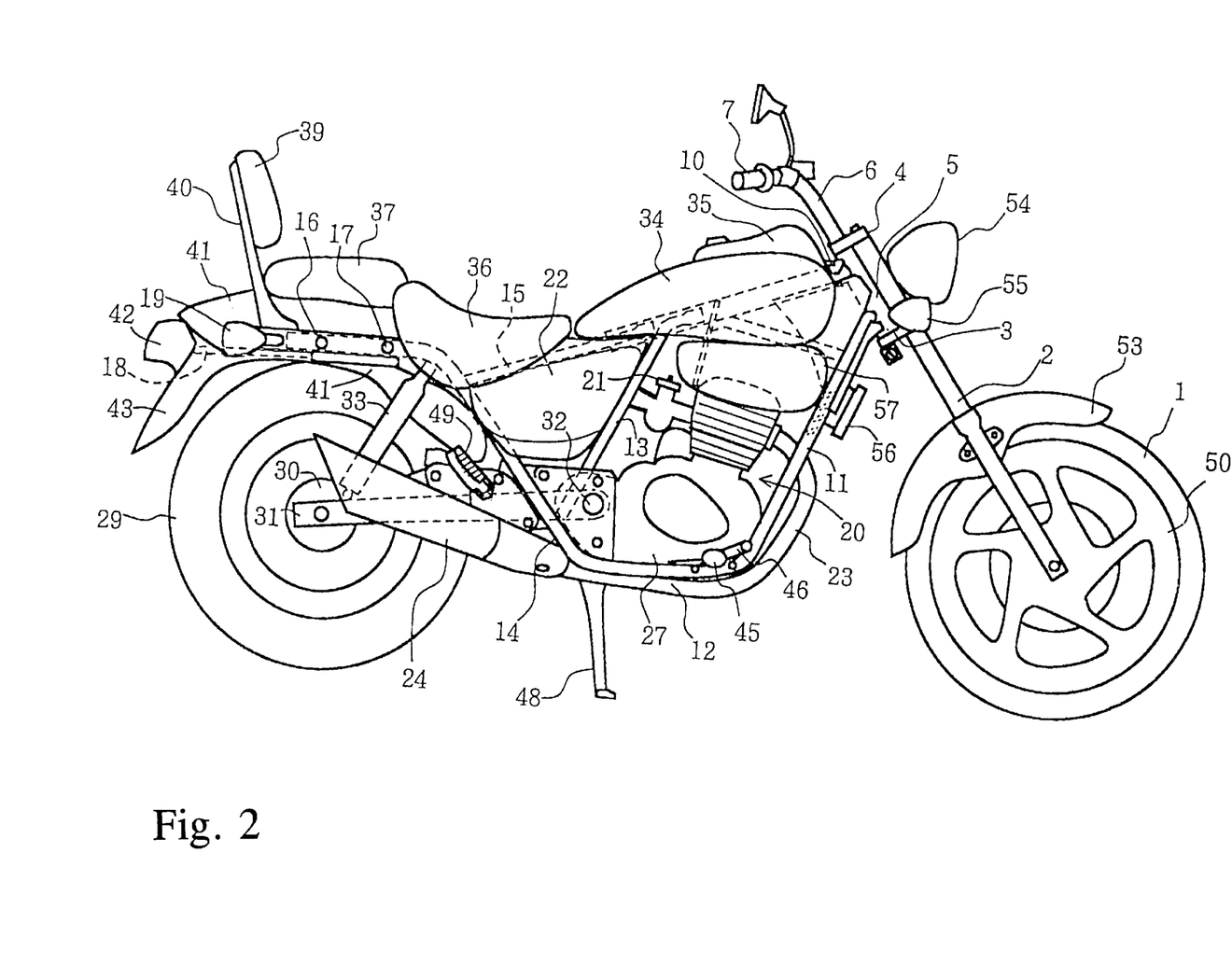
FIG. 2 is a right side view of the entire motorcycle shown in FIG. 1.

Referring to FIGS. 1 and 2, there is shown a motorcycle to which the present invention is applied. The motorcycle includes a front fork 2 supporting a front wheel 1. The front fork includes a bottom bridge 3 and a top bridge 4. The front fork 2 is turnably supported by a head pipe 5 which interacts with the bottom bridge 3 and the top bridge 4. A handlebar 6 is mounted on the top bridge 4. The handlebar 6 has grips 7 disposed rearwardly relative to the top bridge 4.

The head pipe 5 is mounted on a front end of a main frame 10. The main frame 10 extends in a longitudinal direction of the motorcycle. A right down frame 11 and a left down frame 11 extend obliquely downward from right and left sides of a lower portion of the head pipe 5. Lower portions of the right and left down frames 11 are bent rearwardly and continue on to form right and left lower frames 12, respectively. The right and left lower frames 12 extend substantially horizontally in the longitudinal direction.

A right pivot frame 13 and a left pivot frame 13 extend downwardly from a rear end of the main frame 10. The right and left pivot frames 13 extend substantially in parallel to the right and left down frames 11. Right and left rear stays 14 continuously extend obliquely upwardly and rearwardly from rear ends of the right and left lower frames 12. Lower ends of the right and left pivot frames 13 are connected to lower portions of the right and left rear stays 14.

A pair of right and left seat rails 15 extend substantially horizontally rearward from the rear end of the main frame 10. Rear portions of the right and left seat rails 15 are connected to upper portions of the right and left rear stays 14.

The right and left rear stays 14 are curved in the vicinity of the upper portions connected to the right and left seat rails 15. The right and left rear stays 14 extend substantially horizontally after the curve in the vicinity of the upper portions connected to the right and left seat rails 15.

The outer side surface of each of the right and left rear stays 14 is covered with a right grab rail 16 and a left grab rail 16, respectively. The right and left grab rails 16 are mounted to the right and left rear stays 14 at mounting portions 17. The rear ends of the right and left rear stays 14 are connected to a pair of right and left portions of a sub-frame 18 (which will be described later). Right and left rear blinkers 19 are supported on rear ends of the grab rails 16.

The main frame 10, down frames 11, lower frames 12, pivot frames 13, seat rails 15, and rear stays 14 constitute a body frame. A front side of the body frame is composed of the main frame 10, down frames 11, lower frames 12, and seat rails 15. The front side of the body frame forms a cradle type frame structure in which an engine 20 is supported.

Intake air is supplied to the engine 20 through a carburetor 21. Carburetor 21 receives air from an air cleaner disposed behind side covers 22. Exhaust gas is discharged through an exhaust pipe 23 to a muffler 24 and then to the atmosphere.

A sprocket 30 is mounted coaxial with a rear wheel 29. The sprocket 30 is driven by a drive gear 27 on the engine 20 through a chain 28.

The rear wheel 29 is supported on rear ends of right and left rear arms 31. Front ends of the right and left rear arms 31 are pivotably mounted on a pivot portion 32. Pivot portion 32 is provided at an intermediate portion of the pivot frame 13. Right and left dampers 33 are mounted between the rear ends of the right and left rear arms 31 and upper portions of the right and left rear stays 14.

A fuel tank 34 is supported on the main frame 10. An indicating unit 35, including various indicators and meters, is provided on the upper surface of the fuel tank 34. A driver's seat 36 is supported on the right and left seat rails 15 at a position behind the fuel tank 34.

A fellow rider's seat 37 is supported on a rear fender 41 at a position behind the driver's seat 36. A backrest 39 is disposed behind the fellow rider's seat 37. A backrest supporting member 40 (to be fully described later) attaches the backrest 39 to the right and left grab rails 16.

A tail light 42 and a mud guard 43 are supported by the sub-frame 18. The tail light 42 and mud guard 43 extend from a rear end of the rear fender 41.

The motorcycle also includes front steps 45, a brake pedal 46, and a shift pedal 47. The steps and pedals are provided below and forward of the engine 20, thus allowing a riding posture which allows the driver to stretch his legs forward.

The motorcycle also includes a side stand 48, rear steps 49, a wheel 50 made from a light alloy or the like, a brake disk 51, a brake caliper 52, a front fender 53, a head light 54, front blinkers 55, a horn 56, and front side covers 57 for covering the upper side portions of a cylinder of the engine 20.

Figure 3:
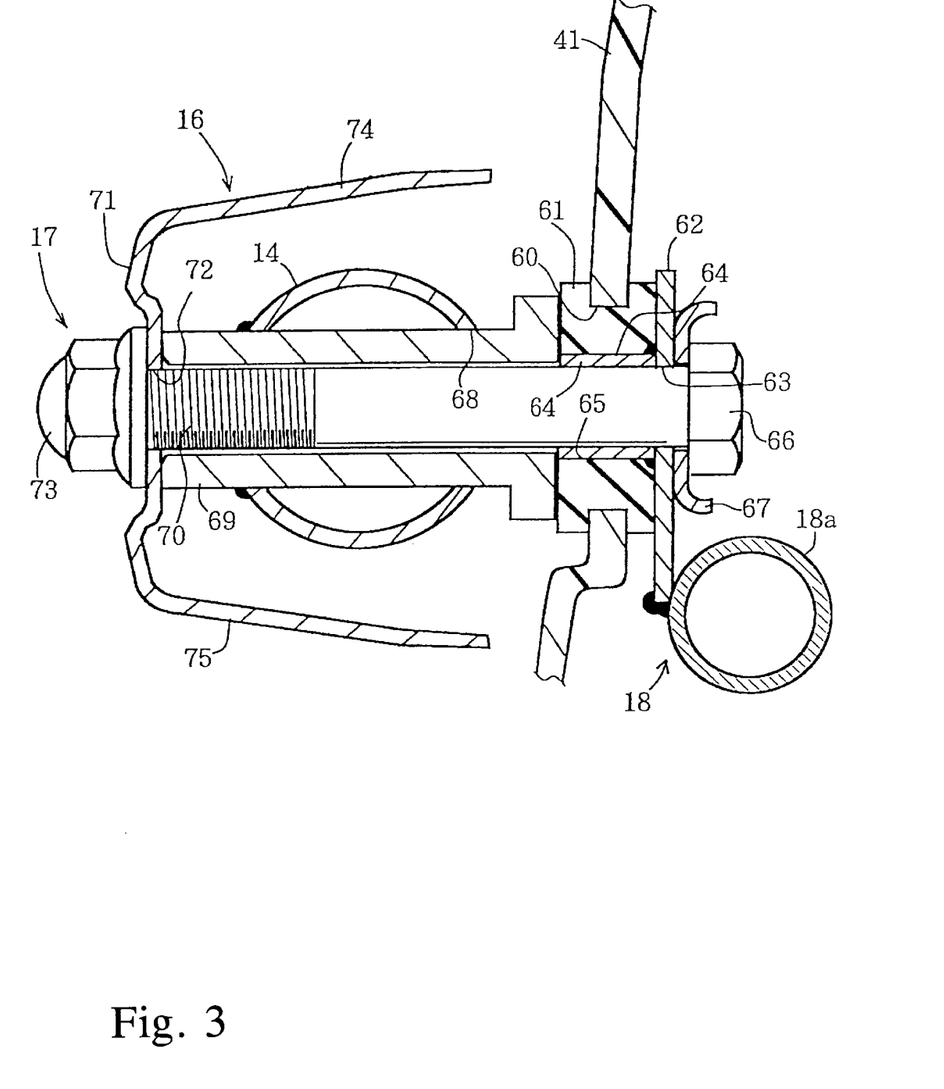
FIG. 3 is a cross sectional view of the rear fender mounting structure of the present invention.

The rear fender mounting structure will be described in detail below, with reference to FIGS. 3 and 4. Each side surface of the rear fender 41 has mounting holes 60. The mounting holes 60 are spaced at suitable intervals along the longitudinal direction. A cylindrical, vibration-proof, rubber member 61 is fitted in each of the mounting holes 60.

The sub-frame 18 is composed of a right pipe portion 18a and a left pipe portion 18a. A right bracket 62 and a left bracket 62 are connected to the right and left pipe portions 18a. The right and left pipe portions 18a extend longitudinally inside the rear fender 41. As illustrated in FIG. 4, near the rear of the motorcycle, the right and left pipe portions 18a are connected to each other in an approximate U-shape, and support the tail light 42.

The right and left brackets 62 are welded on outer peripheral surfaces of front end portions of the right and left pipe portions 18a, respectively. The right and left brackets are attached to the peripheral surfaces in such a manner as to be substantially parallel to side surfaces of the rear fender 41, when the subframe is located inside the rear fender 41.

Each bracket 62 has a pair of mounting holes 63. The mounting holes 63 are spaced in the longitudinal direction. The spacing of the mounting holes 63 corresponds to the spacing between the mounting holes 60 in the rear fender 41. A respective collar 64 is welded at one end thereof to the periphery of each mounting hole 63. Therefore, a pair of collars 64 will protrude away from each bracket 62. During assembly of the motorcycle, the sub-frame 18 is mounted to the rear fender 41 by fitting the collars 64 into holes 65 formed in central portions of the vibration-proof, rubber members 61.

Two fastening assemblies are provided. Each fastening assembly includes a linkage plate 67 having two bolts 66 extending therefrom. The two bolts 66 are spaced apart a distance equal to the spacing between the mounting holes 63 of the bracket 62, which is equal to the spacing between the mounting holes 60 in the rear fender 41. The two bolts are passed through the collars 64 during assembly.

The right and left rear stays 14 are disposed outside the rear fender 41. Each of the right and left rear stays 14 includes a pair of mounting holes 68 at positions capable of corresponding to those of the mounting holes 60 in the rear fender. Flanged collars 69 are pass through each mounting hole 68. The flanged collars 69 can be fixed into the mounting holes 68.

The threaded tip portions 70 of the bolts 66 project outward through the mounting holes 60 in the rear fender 41. The threaded portions 70 can be aligned and inserted into respective ones of the flanged collars 69. Once this is accomplished, the fender will be held relative to the right and left rear stays 14.

Now, the threaded portions 70 can be passed through mounting holes 72 formed in side surfaces 71 of the grab rails 16. Lastly, nuts 73 are fastened onto the threaded portions 70 to secure the arrangement.

Each grab rail 16 is formed in an approximately U-shape in cross-section. The U-shape includes the side surface 71, an upper surface 74, and a bottom surface 75. The rear portions of the right and left rear stays 14 are covered by the U-shaped grab rails 16.

It is to be noted that the right and left rear stays 14 are used as an example of the rear portions of the body frame in the present invention. Other components of the body frame could be made available and support the rear fender and grab rails. For example, rear portions of the right and left seat rails may extend rearwardly and serve as rear portions of the body frame for supporting the rear fender 41. In addition, the relationship between the bolts 66 and the nuts 73 may be reversed. Specifically, the bolts could be inserted from outside of the grab rails 16 and fastened with nuts previously fixed on the brackets 62.

Further, although two bolts passing through sets of two aligned mounting holes have been illustrated, three bolts through sets of three aligned mounting holes, or even more bolts through sets of even more aligned mounting holes, would be within the scope of the invention.

Now reference will be specifically made to a method of assembling a rear fender, subframe, and grab rails to the rear stays of a motorcycle. Referring to FIG. 4, the sub-frame 18 is first preassembled with the rear fender 41 by fitting the collars 64 in the holes 65 formed in central portions of the vibration-proof, rubber members 61. The rear fender pre-assembly is then inserted between the right and left rear stays 14.

Figure 4:
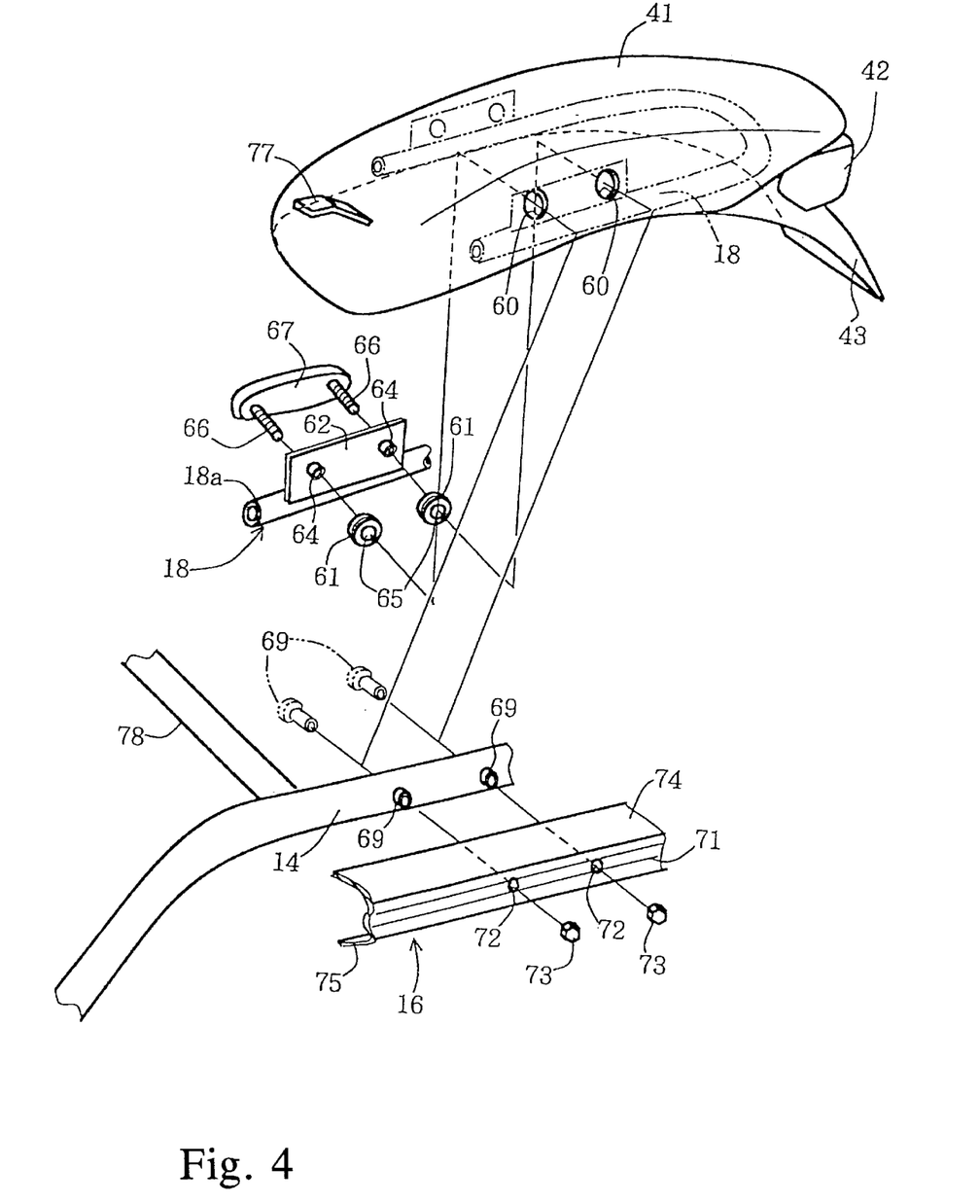
FIG. 4 is an exploded view illustrating the rear fender mounting structure of FIG. 3.

As is apparent from FIG. 4, an approximately L-shaped hook 77 is provided on an upper side of a front end portion of the rear fender 41. The hook 77 projects upward from the upper side of the rear fender 41. As the rear fender pre-assembly is inserted between the right and left rear stays, the hook 77 is rested on or locked on a cross-pipe 78 provided between the right and left rear stays 14.

In such a state, the rear fender pre-assembly, being relatively large in size and weight, can be easily rocked upward with the locked portion taken as a fulcrum. The rear fender pre-assembly is rocked upward until the collars 64 of the brackets 62 align with the collars 69 of the right and left rear stays 14. At this point, the bolts 66 of the fastening assemblies are pushed through the aligned collars 64 and 69. The linkage plates 67 are pushed until the threaded portions 70 of their respective bolts 66 protrude outside the collars 69 of the right and left rear stays 14. At this point, the rear fender pre-assembly is supported on the right and left rear stays 14, and the rear fender preassembly may be released.

Next, the right and left grab rails 16 are disposed along the outer surfaces of the right and left rear stays 14. The threaded tip portions 70 of the bolts 66 are passed through the mounting holes 72 of the right and left grab rails 16. Lastly, the right and left grab rails are secured to the right and left rear stays 14 by fastening the nuts 73 onto the threaded portions 70 of the bolts 66.

The method described above places minimum strain on the person performing the assembly. Further, the method enables the assembly to be quickly and easily performed. By performing this method, the grab rails 16, rear fender 41, and sub-frame 18 are fastened to the rear stays 14 using common bolts 66 and nuts 73. Since the bolts 66 are fixed to the linkage plate 67, the person performing the assembly does not need to hold the bolts 66 when the nuts 73 are tightened onto the threaded portions 70. Also, since collars 64 are used as connection members for the rear fender pre-assembly, the rear fender pre-assembly is simplified, as compared to a case wherein separate connection members, such as screws or nuts and bolts, would be used to form the rear fender pre-assembly. The collar connection members therefore reduce the number of parts needed to form the rear fender pre-assembly.

Figure 6:
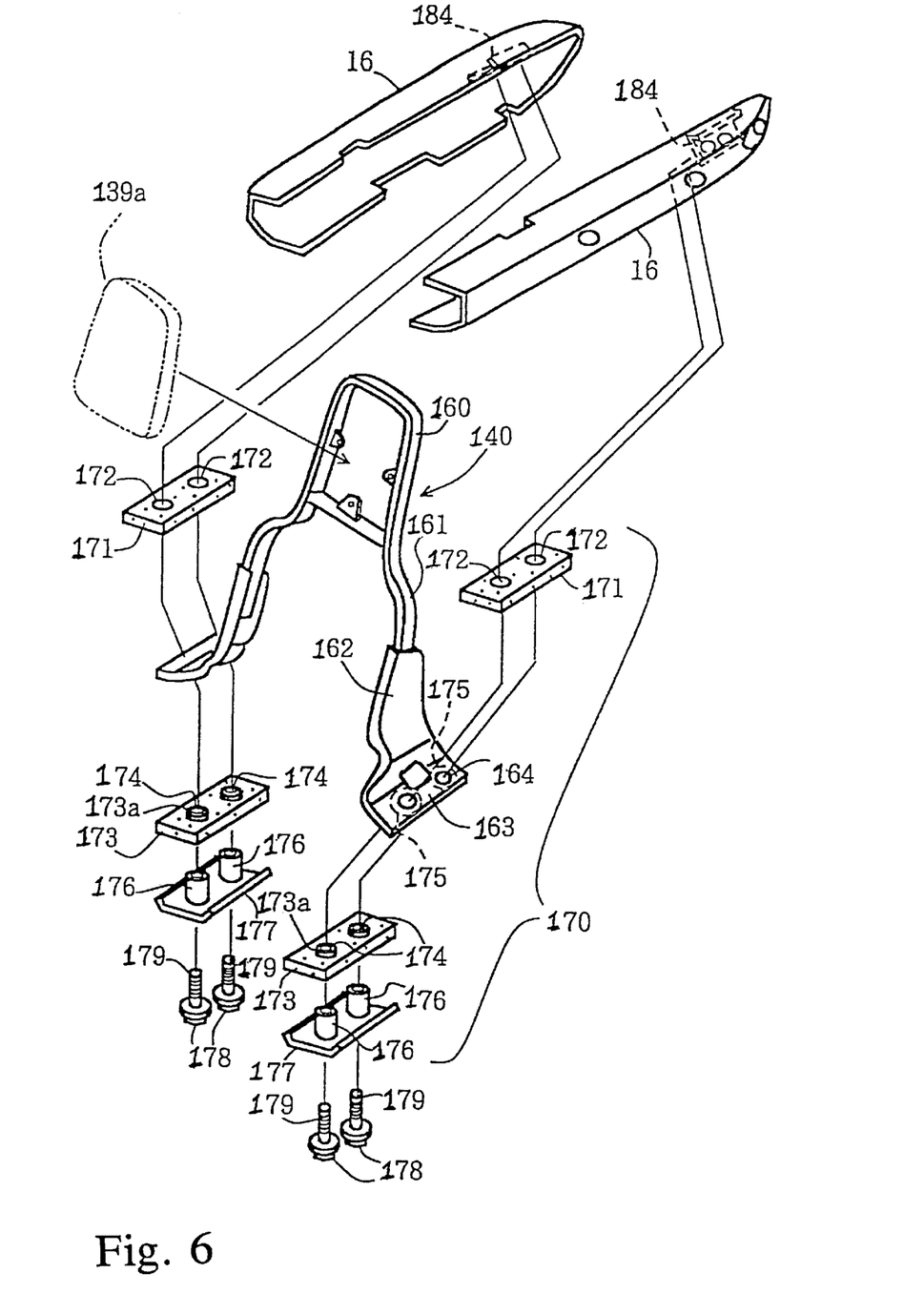
FIG. 6 is an exploded view illustrating the backrest mounting structure of FIG. 5.

Now, the backrest mounting structure for the motorcycle will be described. As shown in FIG. 6, a backrest supporting member 140 includes a frame portion 160 in which a pad portion 139a of the backrest 39 is mounted. Stay portions 161 extend downward from right and left lower portions of the frame portion 160. Brackets 162 are mounted on lower end portions of the stay portions 161.

A lower portion of each bracket 162 is curved in such a manner as to be opened outward at approximately 45 degrees. The lower portion forms a tilted portion 163. The tilted portion 163 has a pair of mounting holes 164 spaced at a suitable gap in the longitudinal direction.

Each bracket 162 is mounted to one of the grab rails 16 through a damping member 170. The damping member 170 includes an upper rubber member 171, a lower rubber member 173, and a linkage washer plate 177 with collars 176 integrally formed thereon. The tilted portion 163 is sandwiched between the upper rubber member 171 and the lower rubber member 173. The damping member 170 is mounted to the bracket 162 with bolts 178.

The upper rubber member 171 has a pair of through-holes 172 longitudinally arranged at positions corresponding to the mounting holes 164 of the tilted portion 163. Likewise, the lower rubber member 173 has a pair of through holes 174 longitudinally arranged at positions corresponding to the mounting holes 164 of the tilted portion 163.

Figure 5:
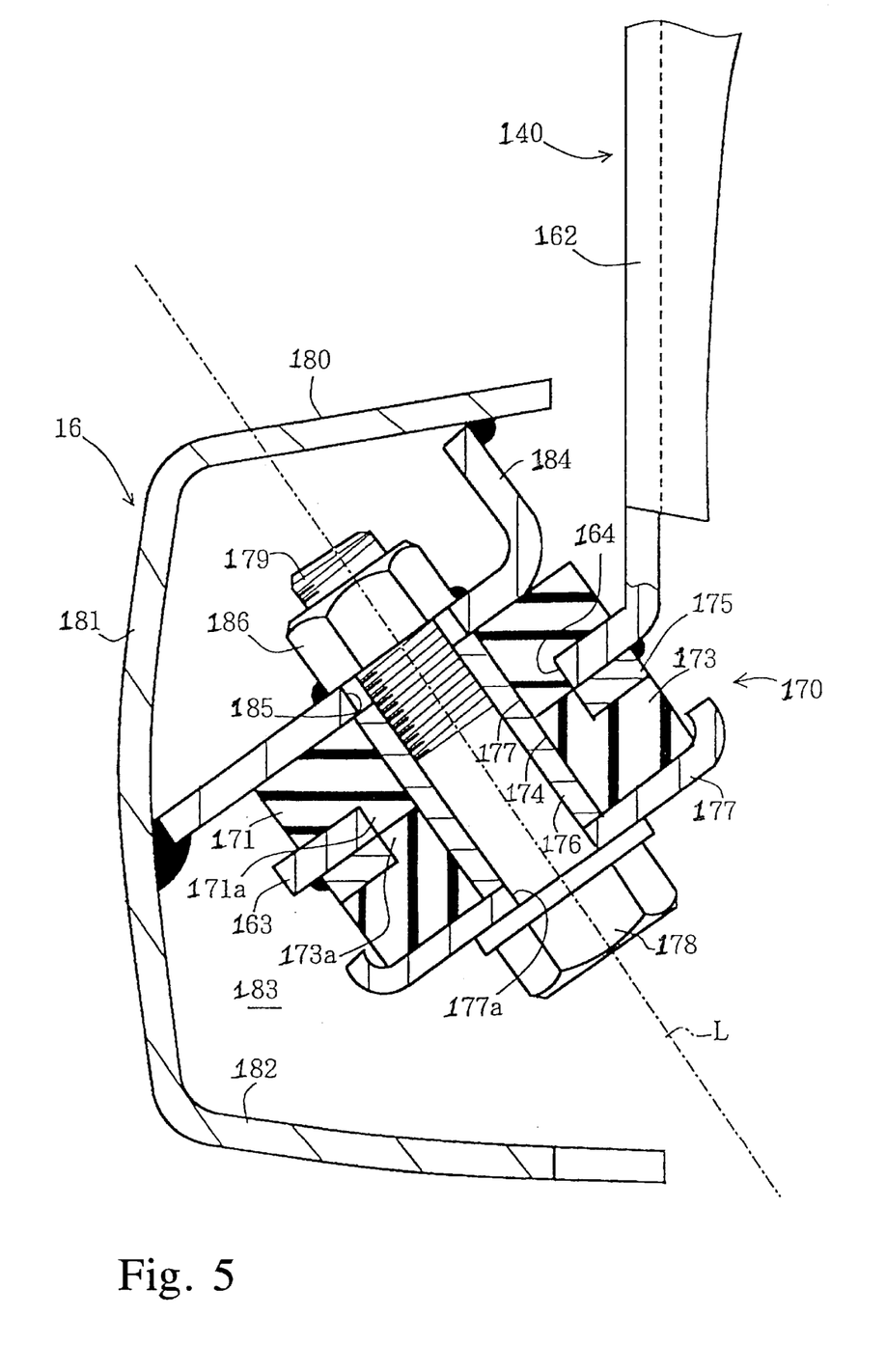
FIG. 5 is a cross sectional view of the backrest mounting structure of the present invention.

As best seen in FIG. 5, projecting portions 171a, each having an outside diameter nearly equal to the inside diameter of the mounting holes 164, are integrally formed around the holes 172 of the upper rubber member 171. The projecting portions 171a extend from the side of the upper rubber member 171 which contacts the tilted portion 163.

Likewise, projecting portions 173a, each having an outside diameter nearly equal to the inside diameter of the mounting holes 164, are integrally formed around the holes 174 of the lower rubber member 173. The projecting portions 173a extend from the side of the lower rubber member 173 closest to the tilted portion 163.

As best shown in FIG. 5, each projecting portion 171a is fitted into one of the mounting holes 164 of the tilted portion 163. Each projecting portion 173a is engaged with a through hole formed in a central portion of a washer 175. The washers 175 have a wall thickness nearly equal to a wall thickness of the tilted portion 163, and each of the washers 175 are welded to the back surface of the tilted portion 163.

A pair of through-holes 177a are longitudinally arranged in the linkage washer plate 177 correspondingly to the through-holes 172 and 174. Collars 176 are mounted around the through-holes 177a, and are fitted in the through-holes 172 and 174 of the upper rubber portion 171 and the lower rubber portion 173.

As is apparent from FIG. 5, each of the right and left grab rails 16 is formed in an approximately U-shape in cross-section. A space 183 surrounded by an upper surface 180, a side surface 181, and a bottom surface 182 is opened inward toward the motorcycle.

In the space 183 of the grab rail 16, a mounting plate 184 is obliquely welded between the upper surface 180 and the side surface 181. A nut 186 is welded around a through-hole 185 formed in an intermediate portion of the mounting plate 184.

A threaded tip portion 179 of a bolt 178 passing through the collar 176 is fastened with the nut 186. A fastening axial line L of the bolt 178 is tilted at approximately 45 degrees relative to horizontal in a direction toward the motorcycle. In addition to being tilted 45 degrees from horizontal, the fastening axial line L of the bolt 178 may be tilted toward the front or rear of the motorcycle. As shown in FIG. 5, the axial line L does not cross the lower surface 182 of the grab rail 16. This permits easy access to the bolt's head by a fastening tool.

Referring to FIGS. 5 and 6, it should be noted that when the backrest mounting structure is assembled, the tilted portion 163 of the bracket 162 is held between the upper rubber member 171 and the lower rubber member 173. The projecting portions 171a are fitted in the mounting holes 164. The projecting portions 173A are fitted in the through-holes of the washer 175 welded on the back surface of the tilted portion 163. Thus, the upper and lower rubber members 171 and 173 are brought in contact with each other.

The collars 176 are inserted in the through-holes 172 and 174 of the rubber members 171 and 173. The linkage washer plate 177 is brought in contact with the lower surface of the lower rubber member 173. Thus, the damping member 170 is integrally mounted on the bracket 162, to form a pre-assembly.

After forming the pre-assembly, the lower portion of the bracket 162 is inserted in the space 183 of the grab rail. The damping member 170 is brought in contact with the bottom of the mounting plate 184. At this point, leading ends of the collars 176 correspond to the through holes 185 of the mounting plate 184.

The bolts 178 are inserted in the though-holes 177a of the linkage washer plate 177 from the bottom. The bolts 178 pass through the collars 176. Then, the threaded tip portions 179 of the bolts 178 are fastened with the nuts 186. Thus, the backrest supporting members 140 are elastically supported on the grab rails 16.

Since the bolts 178 are tilted relative to the horizontal or vertical planes of the motorcycle, and since the fastening axial line L does not cross the lower surface 182 of the grab rail 16, it is relatively easy to access the bolt with a tool. Therefore, fastening the bolt into the nut can be simply and quick performed.

The backrest mounting structure described above dampens the backrest supporting members from vibration. Therefore, if the backrest supporting members 140 are held as grips by the fellow rider, vibrations from the motorcycle, particularly the engine, are dampened. Since the fastening axial line L is tilted, any load applied to the backrest is divided into component forces in the thrust and radial directions when received by the damping member 170. This division of the component forces enhances the cushioning effect, and results in a backrest which is less prone to vibrations from the motorcycle.

Since the attachment of the backrest to the motorcycle occurs in the internal space of the grab rail 16, a neat and uniform appearance of the motorcycle is maintained.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motorcycle component arrangement comprising:

a motorcycle frame including a right frame member and a left frame member;

a rear fender disposed between said right and left frame members and at least one connection between said rear fender and said right and left frame members being located between said right and left frame members;

grab rails disposed adjacent said right and left frame members; and a subframe disposed inside said rear fender, wherein said subframe is preassembled to said rear fender to form a rear fender preassembly, and said rear fender preassembly and said grab rails are fixed to said right and left frame members.

2. The motorcycle component arrangement according to claim 1, further comprising:

a hook formed on said rear fender; and a cross-pipe provided between said right and left frame members, wherein said hook engages said cross-pipe.

3. The motorcycle component arrangement according to claim 1, wherein said grab rails have a U-shaped cross section, and said U-shaped cross section faces toward said right and left frame members so as to cover said right and left frame members.

4. The motorcycle component arrangement according to claim 1, wherein said subframe includes a right portion and a left portion, said right portion includes a first collar having a first hole therethrough, said left portion includes a second collar having a second hole therethrough; said rear fender includes a right side and a left side, said right side having a third hole therein; said left side having a fourth hole therein; and said rear fender preassembly is formed by fitting said first collar in said third hole and said second collar in said fourth hole.

5. The motorcycle component arrangement according to claim 4, further comprising:

a first bolt for passing through said first hole in said first collar; and a second bolt for passing through said second hole in said second collar.

6. The motorcycle component arrangement according to claim 4, further comprising:
- a first bushing lining said third hole in said right side of said rear fender, wherein said first collar passes through said first bushing; and
- a second bushing lining said fourth hole in said left side of said rear fender, wherein said second collar passes through said second bushing.

7. The motorcycle component arrangement according to claim 4, wherein said right portion of said subframe includes a third collar having a fifth hole therethrough, said left portion of said subframe includes a fourth collar having a sixth hole therethrough; said right side of said rear fender has a seventh hole therein; said left side of said rear fender has a eighth hole therein; and said rear fender preassembly is further formed by fitting said third collar in said seventh hole and said fourth collar in said eighth hole.

8. The motorcycle component arrangement according to claim 7, further comprising:
- a first bushing lining said third hole in said right side of said rear fender, wherein said first collar passes through said first bushing;
- a second bushing lining said fourth hole in said left side of said rear fender, wherein said second collar passes through said second bushing;
- a third bushing lining said seventh hole in said right side of said rear fender, wherein said third collar passes through said third bushing; and
- a fourth bushing lining said eighth hole in said left side of said rear fender, wherein said fourth collar passes through said fourth bushing.

9. The motorcycle component arrangement according to claim 8, wherein said first, second, third, and fourth bushings are formed of rubber.

10. The motorcycle component arrangement according to claim 7, further comprising:
- a first bolt for passing through said first hole in said first collar;
- a second bolt for passing through said second hole in said second collar;
- a third bolt for passing through said fifth hole in said third collar; and
- a fourth bolt for passing through said sixth hole in the fourth collar.

11. The motorcycle component arrangement according to claim 10, further comprising:
- a first linkage connecting a head of said first bolt to a head of said third bolt; and
- a second linkage connecting a head of said second bolt to a head of said fourth bolt.

12. The motorcycle component arrangement according to claim 11, wherein said first linkage is located inside said rear fender, adjacent said right side of said rear fender; and said second linkage is located inside said rear fender, adjacent said left side of said rear fender.

13. A method of assembling components of a motorcycle, said method comprising the steps of:
- providing a motorcycle frame with a right frame member and a left frame member;
- providing a rear fender, a subframe, and grab rails;
- inserting the subframe inside the rear fender;
- attaching the subframe to the rear fender to form a rear fender preassembly;
- inserting the rear fender preassembly between the right frame member and the left frame member;
- fixing the rear fender preassembly to the right frame member and the left frame member; at a location between the right frame member and the left frame member and
- attaching the grab rails to the right frame member and the left frame member.

14. The method according to claim 13, further comprising:
- providing a two holes in the right frame member, two holes in the left frame member, two holes in a right side of the rear fender, two holes in the left side of the rear fender, two holes in a right portion of the subframe each being surrounded by a protruding collar, two holes in a left portion of the subframe each being surrounded by a protruding collar, two holes in a right section of the grab rails, and two hole in a left section of the grab rails; and
- when inserting the subframe inside the rear fender, inserting each protruding collar into respective ones of the holes of the rear fender to thereby form the rear fender pre-assembly.

15. The method according to claim 14, further comprising:
- providing a bracket on the rear fender, a crossbar on the motorcycle frame, and fastening devices;
- hooking the bracket on the crossbar;
- lifting a portion of the rear fender so as to pivot the rear fender about the cross bar until the holes of the rear fender are aligned with the holes of the right and left frame members of the motorcycle frame; and
- inserting the fastening devices through the aligned holes.

16. The method according to claim 15, further comprising:
- when attaching the grab rails, passing the fastening devices through the holes of the grab rails, and fixing the fastening devices.

17. A motorcycle component arrangement comprising:
- a backrest;
- right and left supporting members extending downward from right and left sides of said backrest, respectively;
- a motorcycle frame;
- right and left grab rails disposed on right and left sides of said motorcycle frame, respectively, each grab rail having an approximate unshaped cross section which opens toward said motorcycle frame;
- right and left mounting plates disposed inside the approximate U-shape cross section of said right and left grab rails, respectively; and
- right and left lower end portions provided on said right and left supporting members, respectively; said right lower end portion being attached to said right mounting plate by a first fastener, and said left lower end portion being attached to said left mounting plate by a second fastener.

18. The motorcycle component arrangement according to claim 17, wherein, said first and second fasteners extend in directions which are tilted relative to horizontal, so that said first and second fasteners may be easily accessed by a fastening tool.

19. The motorcycle component arrangement according to claim 17, further comprising:
- a right dampening member disposed between said right lower end portion and said right mounting plate, and a left dampening member disposed between said left lower end portion and said left mounting plate.

20. The motorcycle component arrangement according to claim 19, wherein said right lower end portion includes two holes, said left lower portion includes two holes, said right mounting plate includes two holes, said left mounting plate includes two holes, said first fastener includes two bolts, said second fastener includes two bolts, said attachment between right lower end portion and said right mounting plate in accomplished by passing said two bolts of said first fastener through said two holes of said right lower end portion and said two holes of said right mounting plate, and said attachment between left lower end portion and said left mounting plate in accomplished by passing said two bolts of said second fastener through said two holes of said left lower end portion and said two holes of said left mounting plate.

* * * * *